United States Patent [19]
Conley

[11] 3,747,897
[45] July 24, 1973

[54] METHOD AND APPARATUS FOR PROTECTING LIVESTOCK
[76] Inventor: Charles F. Conley, Otter, Mont. 59062
[22] Filed: Oct. 16, 1972
[21] Appl. No.: 297,790

[52] U.S. Cl............. 256/10, 119/63, 43/98, 256/1, 317/262 S
[51] Int. Cl. ............. A01k 3/00, H05c 1/00
[58] Field of Search.............. 119/63, 29, 29.5; 49/70, 58, 59; 256/10; 43/98, 99; 317/252 S

[56] References Cited
UNITED STATES PATENTS
2,885,610  5/1959  Mueller ........................... 317/262 S
392,347  11/1888  Krause ............................. 256/24
3,366,854  1/1968  Robinson ......................... 256/10
3,112,731  12/1963  Lako et al. ....................... 256/10

Primary Examiner—David J. Williamowsky
Assistant Examiner—Conrad L. Berman
Attorney—Claude W. Lowe, Joseph B. Bowan et al.

[57] ABSTRACT

A livestock protection method of providing an enclosure fence with an electric shock wire and an odoriferous, noxious repellent whereby a predator simultaneously receives an electric shock while sensing the repellent. Flexible stripping material for attachment to the enclosure fence is disclosed which provides a trough for holding the repellent, an insulation lip for holding the electric shock wire, and a deflector for holding weeds and grasses away from the electric wire.

6 Claims, 5 Drawing Figures

PATENTED JUL 24 1973 3,747,897

METHOD AND APPARATUS FOR PROTECTING LIVESTOCK

BACKGROUND AND SUMMARY OF THE INVENTION

Western ranchers have long experienced various problems associated with the protection of livestock. Since a majority of the time livestock is left unattended on extensive ranges, the animals may fall victim to marauding predators such as wolves, coyotes, wild dogs, and the like. A traditional approach is simply the eradication of the predators. For ecological and social reasons, predator control proposals, particularly those relating to indiscriminate methods which shock the public conscience such as poisoning and trapping, are under careful scrutiny.

Accordingly, some attempts have been devised to repel, without injury, the predators from livestock and thereby permit the predators to forage from wildlife rather than domestic stock. Once such attempt is disclosed in U. S. Pat. No. 3,405,688 by Gerhardi, relating to a device worn by the animal to be protected and which carries a substance having a noxious and repugnant odor repulsive to the olfactory senses of predators. Repellent devices of this character have not proved completely satisfactory in that either the predator, under continued exposure to the repellent, becomes sufficiently accustomed to the odor to override its repellent features, or newly born stock go unprotected until such time as a repellent device can be secured to the animal, the latter problem being particularly acute for sheep ranchers during the lambing period.

Therefore, a need has remained for a highly effective method of protecting livestock from predators without harm to either animal. A primary object of this invention is to provide such a method.

More particularly, an object of this invention is to provide a method and apparatus for protecting livestock in which the predator receives an electrical shock while sensing a repulsive odor whereby the predator's murderous designs are thwarted by this unpleasant experience. By conditioning the predator in this manner, the animal is programmed to be repulsed by either stimuli in the future and, therefore, livestock may be more effectively protected by means of the repellent alone emitting the pungent essence, or by an electrical shock, or by both.

A further object of the invention is to provide stripping material which may be supplied in rolls and which may be conveniently attached to a fence or corral in order to hold the electric fence wire in position to contact the predator and also to hold the odoriferous repellent.

Other and further objects of the invention, together with the features of novelty appurtenant thereto, will appear in the course of the following description.

DESCRIPTION OF THE DRAWING

In the accompanying drawing, which forms a part of the specification and is to be read in conjunction therewith, and in which like reference numerals are employed to indicate like parts in the various views.

Figure 1:
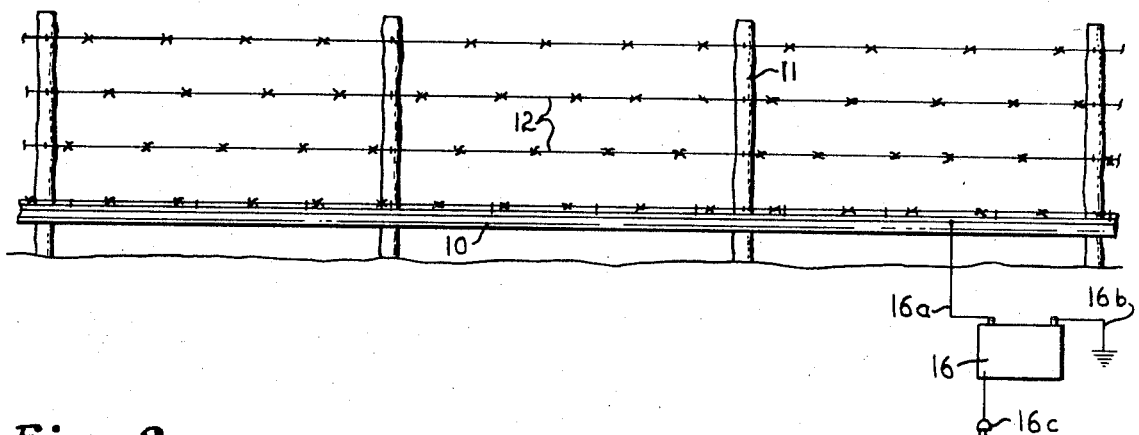
FIG. 1 is a side elevational view of a portion of fencing on which is installed apparatus constructed in accordance with a preferred embodiment of the invention for carrying out the novel method.

In order to practice my method in its broadest sense, it is necessary to provide the fence or corral enclosing the livestock with a conventional electric fence wire and to provide the odoriferous repellent closely adjacent to the electric fence in order to carry out the purpose of simultaneously subjecting the predator to an electric shock and the offensive fumes of the repellent. In the latter regard, any suitable odoriferous substance may be employed, but it is preferable to use a highly noxious substance having a powerful odor such as one of the mercaptans. In the event the method is adapted for use close to dwellings or in populated areas for repelling dogs from private yards, flower beds, or public parks, an equally persistent but more pleasant odor (from the human standpoint) could be employed.

Referring to the drawings in more detail, the method is preferably practiced with a stripping material, generally referred to be the numeral 10, which is mounted to a corral or stock retaining fence, typically comprising a plurality of spaced posts 11 on which strands of barbed wire 12 are attached. The fencing surrounds the livestock to define a grazing area or pasture.

Figure 2:
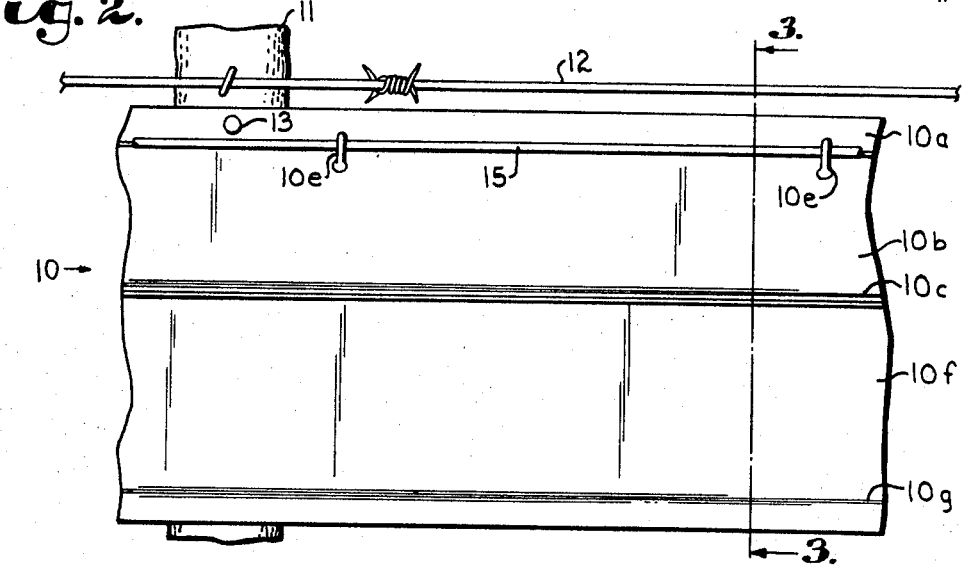
FIG. 2 is an enlarged elevational view of a portion of the strip material holding the electric fence wire and the odoriferous repellent.
Figure 3:
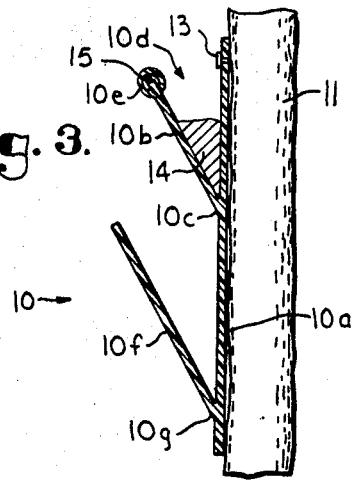
FIG. 3 is a sectional view of the strip, taken along line 3—3 of FIG. 2 in the direction of the arrows.

Referring to the stripping material 10 in more detail, particular attention is directed to FIGS. 2 and 3. The stripping material is preferably fabricated from a flexible plastic and comprises a rear sheet or base portion 10a which is secured to the post 11 by nails 13. Alternatively, the base portion 10a may be secured to the fencing wire 12 or to iron fence posts by means of clips or ring members (not shown) thereby piercing the clip through the material of the base 10a. Projecting outwardly from the base portion 10a is a shelf or lip member 10b integrally journaled at the lower edge thereof to the base portion 10a providing a joint or seam 10c. As shown in FIG. 3, the lip 10b is angularly disposed with respect to the base 10a and forms therewith a V-shaped trough 10d suitable for retaining the odoriferous repellent 14 having a grease-like or wax carrier vehicle of sufficient consistency and cohesiveness to adhere in the trough 10d.

Figure 5:
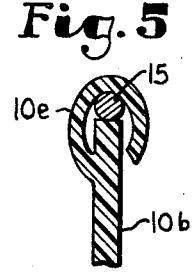
FIG. 5 is an enlarged side view of a retaining clip for holding electric fence wire.

Preferably molded to the lip 10b in spaced relationship along the upper edge thereof, are a plurality of wire retaining clips 10e. Each clip 10e, as shown in FIG. 5, is basically in the form of an unjoined ring having a slit through which a conventional electric fence wire 15 may be pushed and retained therein. Alternatively, instead of molded clips 10e, the electric fence wire 15 may be secured to the upper edge of the lip 10b by means of ring members (not shown) encircling the wire and grasping or piercing a portion of the lip 10b. As previously mentioned, the entire strip is preferably fabricated from a plastic. In the event the strip is fabricated from some other material, it should be noted that the lip 10b, or at least that portion of the lip in contact with the wire 15, must be non-conducting material.

Beneath the lip 10b and projecting outwardly from the base 10a is a shield or deflector tape 10f integrally journaled at the lower end of the base 10a providing a joint or seam 10g. The upper edge of the deflector tape 10f extends horizontally outward from the base 10a a greater distance than that distance which the upper edge of lip 10b extends from the base 10a. In addition, the distance between the lower edge of the lip 10b and the lower edge of the deflector tape 10f is at least as great as, and preferably slightly greater than, the width of the deflector tape 10f itself, the purpose of which will shortly be seen.

Referring again to FIG. 1, the electric fence wire 15 is connected by an electrical lead 16a to a fence charger 16. As those skilled in this art will easily recognize, the fence charger 16 may be of a variety of conventional types, each basically having a grounded terminal 16b and a power source connection 16c which may be connected to an alternating or direct current source so that the charger 16 applies a voltage potential to the fence wire 15.

Figure 4:
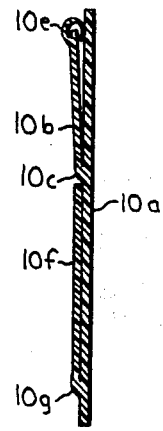
FIG. 4 is a sectional view of the strip as it would appear supplied from a roll prior to installation on the fencing.

Referring to FIG. 4, the stripping material 10 is shown in cross section as it would appear on a storage roll prior to being unrolled and installed on a fence. When the stripping material 10 is rolled up, the lip 10b folds inwardly against the base 10a, such folds accomplished due to the flexibility of the material at the seams 10c and 10g respectively. The portions 10b and 10f of the strip are caused to deform against the base 10a by subsequent layers or wraps of the material on the roll. However, when the portions 10b and 10f are not biased to the base 10a, these portions resiliently return to the outwardly extending positions as shown in FIG. 3.

It should be noted that the tape 10f is so sized, and is attached to the base 10a at a position such that when in the folded position (i.e., on a roll) the tape 10f does not overlie the lip 10b to create a triple thickness of material, but rather it lies only against the base 10a to create a double thickness of material in that layer of the roll.

In the latter regard, it should be further noted that when in the extended position, the shild 10f extends outwardly from the vertical plane of electric fence wire 15. In this fashion, the shield 10f acts to deflect any weeds or grass from contacting the wire 15 and grounding the electric fence to render it inoperable to deliver a shock to an animal touching it.

When the stripping material 10 is installed around the perimeter of a pasture containing livestock to be protected from predators, an electric fence wire 15 is positioned on the lip 10b, held by clips 10e, at a location in height which a predator will most likely contact in attempting to gain access to the pasture. The odoriferous repellent 14 is placed in the trough 10d. Although the repellent 14 need not continuously fill the trough 10d along the entire length thereof, successive quantities of the repellent 14 along the length of the strip 10 must be sufficiently close in order that the fumes of the noxious substance permeate the space around the electric wire 15 throughout the entire length thereof. Connecting the fence wire 15 to a fence charger 16 completes installation of the protecting apparatus.

From the foregoing, it will be understood that this invention is one well adapted to attain all the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth, or shown in the accompanying drawing, is to be interpreted as illustrative and not in a limiting sense.

Having thus described my invention, I claim:

1. A method of protecting livestock from predators, the steps of said method comprising:

impounding the livestock within a perimeter barrier which a predator must cross to gain access to said livestock;

mounting an ungrounded electrical conducting element to said barrier which a predator contacts in attempting to cross said barrier;

applying a voltage potential to said conducting element; and providing an odoriferous scent closely adjacent to said conducting element, whereby a predator intent on crossing said barrier will be discouraged therefrom upon contacting said conducting element and receiving an electrical shock, such being associated with the odoriferous scent so that said predator will attempt to avoid any subsequent encounter of said scent.

2. Apparatus for protecting livestock confined within a perimeter barrier from predators, said apparatus comprising:

an elongate flexible strip member mounted to said barrier;

an odoriferous substance associated with said strip member throughout the length thereof;

an ungrounded electrical wire held closely adjacent said strip member; and voltage supply means connected to said wire to provide a voltage potential thereto, whereby a predator intent on crossing said barrier to gain access to said livestock will be discouraged therefrom upon contacting said wire and receiving an electrical shock while sensing the odoriferous substance, such that the predator associates said substance with the electrical shock and henceforth avoids any subsequent encounter of said substance.

3. The apparatus as in claim 2, said strip member including a base portion connected to and supported by said barrier; an outwardly projecting, non-conducting shelf connected to said base portion and forming with said base portion an elongate V-shaped trough for containing said odoriferous substance and having an outer edge on which is secured said electrical wire; and a lower deflector edge integral with said base portion extending outwardly past said electrical wire to hold grasses and weeds away from said wire.

4. The apparatus as in claim 3, said shelf integrally, but deformably attached to said base portion to fold thereagainst when said strip member is rolled up.

5. The apparatus as in claim 3, said lower deflector edge comprising a shield strip integrally, but deformably attached to said base portion to fold thereagainst when said strip member is rolled up.

6. The apparatus as in claim 3, said shelf integrally, but deformably attached to said base portion at a first seam to fold against said base portion when said strip member is rolled up, and the apparatus including a shield strip integrally, but deformably attached to said base portion at a second seam to fold against said base portion when said strip member is rolled up, said shield strip being of greater width than said shelf and said second seam disposed beneath said first seam at least the distance of the width of said shield strip.

* * * * *